Feb. 19, 1963 L. F. W. DIJKEMA 3,077,765
APPARATUS FOR PERIODICALLY DETERMINING THE CARBON
DIOXIDE CONTENT OF A CARBON DIOXIDE CONTAINING
LIQUID FLOWING THROUGH A CONDUIT
Filed Nov. 19, 1959
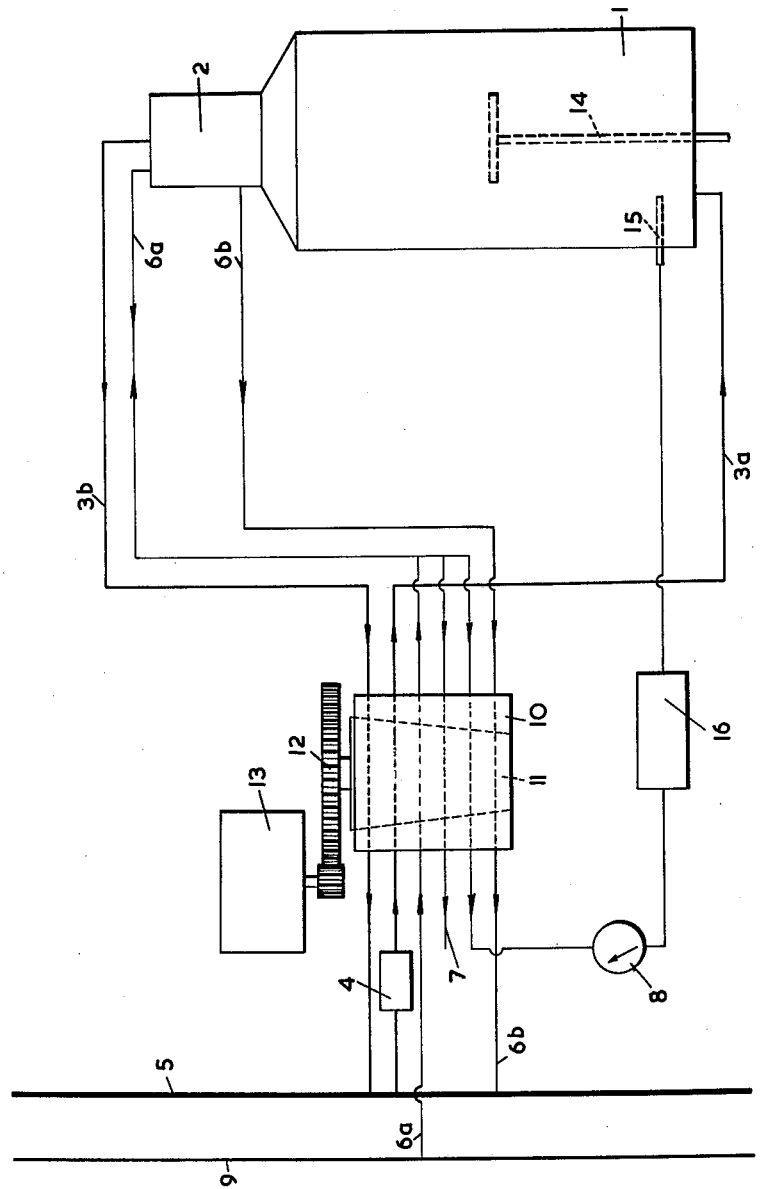

United States Patent Office 3,077,765
Patented Feb. 19, 1963

3,077,765
APPARATUS FOR PERIODICALLY DETERMINING THE CARBON DIOXIDE CONTENT OF A CARBON DIOXIDE CONTAINING LIQUID FLOWING THROUGH A CONDUIT
Leendert Frederik Willem Dijkema, Rotterdam, Netherlands, assignor, by mesne assignments, to Heineken's Brouwerijen Nederland N.V., Amsterdam, Netherlands, a limited liability company of The Netherlands
Filed Nov. 19, 1959, Ser. No. 854,078
Claims priority, application Netherlands Nov. 25, 1958
2 Claims. (Cl. 73—19)

The present invention relates to an apparatus for periodically determining the carbon dioxide content of a carbon dioxide containing liquid flowing through a conduit and is based on the phenomenon that when there is an equilibrium between the carbon dioxide dissolved in a liquid contained in a container and the gaseous carbon dioxide contained in a gas space over the liquid in said container the pressure in the gas space and the temperature of the liquid are a measure for the carbon dioxide content of the liquid.

Accordingly the apparatus according to the invention comprises a liquid container included in a by-pass adapted to be connected to said conduit and provided with a supply pump adjacent its inlet end, the upper portion of said container forming a gas space and being included in a carbon dioxide carrying line, stop valves operating in timed interrelationship being provided in the supply and the discharge branches of said conduit and said line for connecting and disconnecting the container to and from a source of carbon dioxide containing liquid and a source of carbon dioxide and to a pressure (and temperature) responsive recording device. According to the invention the stop valves may be combined into a single composite stop valve.

The invention will be elucidated by means of an embodiment of the apparatus according to the invention which is described with reference to the accompanying schematic drawing.

According to the drawing the apparatus comprises a container 1 the narrowed upper portion 2 is meant to perform the function of a gas space. Between its upper and lower end the container 1 is included in a by-pass 3a—3b which by-pass adjacent its inlet end is provided with a supply pump 4. The ends of the by-pass are connected to a conduit 5, through which a carbon dioxide containing liquid flows, the carbon dioxide content of which liquid is to be determined and to be recorded periodically e.g. once a minute. The supply branch 3a and the discharge branch 3b of the by-pass 3a—3b are each provided with a stop valve.

The gas space 2 of the container 1 is included in a line 6a—6b, the line 6a which contains a stop valve having branches leading to a free outlet 7 and to a pressure gauge 8, being connected to a carbon dioxide carrying line 9 and the line 6b which likewise contains a stop valve, being connected to the liquid conduit 5.

All of the stop valves are combined into a single plug valve, the valve housing 10 and the plug 11 of which are provided with such a number of passages that per revolution of the plug 11 the by-pass 3a—3b and the lines 6a—6b with their associated branches are opened and closed in a pre-determined sequence and in a pre-determined timed interrelationship as described hereinafter. The plug 11 may be driven by an electromotor 13 via a transmission 12 at a constant rate of e.g. one revolution per minute.

Furthermore the container 1 is provided with a vibrator 14 and a thermometer 15, the latter, just as the pressure gauge 8 being connected to a recording device 16.

The operation of the apparatus is as follows:
After the electromotor 13 has been put into operation the plug 11 is continuously rotated. During each revolution of the plug the vessel 1 is first entirely filled with liquid from the conduit 5 because the plug opens the supply branch 3a and the discharge branch 3b of the by-pass, the pump 4 being synchronously put into operation. Subsequently the by-pass branches 3a and 3b are closed and the lines 6a and 6b are opened so that, under a slight over-pressure, carbon dioxide is pressed from the conduit 9 to the gas space 2 (3% of the contents of the container 1). At the same time the liquid contained in the gas space 2 is pressed via line 6b into the liquid carrying conduit 5 whereupon the communication with the liquid conduit 5 is closed while simultaneously the supply of carbon dioxide via line 6a is discontinued and the outlet 7 is opened, so that the pressure in the gas space 2 is reduced to the atmospheric pressure. In synchronism with the closing of the outlet 7 the vibrator is put into operation and by means of said vibrator the equilibrium between the gaseous phase in the gas space 2 and the liquid phase in the container 1 is established.

Immediately thereafter the branch leading to the pressure gauge 8 is opened so that the pressure in the gas space 2 is measured, the indication of the pressure gauge 8 and of the thermometer 15 being fed to the recording device 16 so that the value of the carbon dioxide content of the liquid contained in the container 1, which value follows from said indications, is recorded. Now one cycle of the plug 11 has been completed and the next cycle starts, during which the carbon dioxide content of a new charge of the vessel 1 is determined and recorded and so on, so that at predetermined intervals the required measurements are taken and recorded.

If the apparatus is disposed in an enclosure in which the liquid flowing through the liquid carrying conduit 5 is kept at a constant temperature it will be sufficient to record the pressure in the gas space for determining the carbon dioxide content, said pressure being determinative for the carbon dioxide content of the liquid flowing through the conduit.

It stands to reason that there is a great measure of freedom in the structural embodiment of the stop valves in the liquid and gas lines, which may or may not be combined into one valve. If there is no need for determining and/or recording the carbon dioxide content of a liquid flowing through a conduit at regular intervals it is also possible to determine the carbon dioxide content from time to time by manually operating the stop valve or valves in which case the driving electromotor is put out of operation or is omitted altogether.

Furthermore it will be clear that the recording device 16 may be replaced by or associated with a control system which responds to the pressure measured and is capable of feeding carbon dioxide into the liquid when the carbon dioxide content of said liquid falls below a pre-determined value.

I claim:
1. An apparatus for periodically determining the carbon dioxide content of a carbon dioxide-containing liquid flowing through a supply line comprising, in combination, a liquid container included in a by-pass defined by a first conduit connected to said supply line and to the lower portion of said container and a second conduit connected to said supply line and to the upper portion of said container, means for causing said liquid to flow through said first conduit from said supply line into said container the upper portion of said container defining a gas space communicating with said second conduit, a second supply line adapted to contain gaseous carbon dioxide, a third conduit connecting the upper portion of said gas space with said second supply line, a fourth conduit connecting the lower portion of said gas space with said first-named supply line, a first branch conduit connected to said third conduit and communicating with an outlet communicating with the atmosphere, a second branch conduit connected to said third conduit and to a pressure indicating and recording device, means making said device responsive to the temperature of the contents of said container, vibrating means disposed in the lower portion of said container, valve means for selectively opening and closing each of said conduits and each of said branch conduits, and means for actuating said valve means to effect seriatim the following operations: opening of the first conduit and opening of said second conduit, closing of said first conduit and said second conduit and opening of said third conduit and said fourth conduit, closing of said third conduit and said fourth conduit, opening of said first branch conduit, closing of said first branch conduit and actuation of said vibrating means, opening of said second branch conduit, and closing of said second branch conduit where said pressure is a function of carbon-dioxide content of said liquid at said temperature.

2. An apparatus for periodically determining the carbon dioxide content of a carbon dioxide-containing liquid flowing through a supply line comprising, in combination, a liquid container included in a by-pass defined by a first conduit connected to said supply line and to the lower portion of said container, pump means in said first conduit and a second conduit connected to said supply line and to the upper portion of said container, the upper portion of said container defining a gas space communicating with said second conduit, a second supply line adapted to contain gaseous carbon dioxide, a third conduit connecting the upper portion of said gas space with said second supply line, a fourth conduit connecting the lower portion of said gas space with said first-named supply line, a first branch conduit connected to said third conduit and communicating with an outlet communicating with the atmosphere, a second branch conduit connected to said third conduit and to a pressure indicating and recording device, said recording device including temperature indicating means disposed in the lower portion of said container, vibrating means disposed in the lower portion of said container, a single unit and valve means for selectively opening and closing each of said conduits and each of said branch conduits, and means for actuating said valve means to effect seriatim the following operations: opening of the first conduit and opening of said second conduit, closing of said first conduit and said second conduit and opening of said third conduit and said fourth conduit with simultaneous stopping of said pump means, closing of said third conduit and said fourth conduit, opening of said first branch conduit, closing of said first branch conduit and actuation of said vibrating means, opening of said second branch conduit, and closing of said second branch conduit, wherein said pressure is a function of carbon-dioxide content of said liquid at said indicated temperature.

References Cited in the file of this patent

UNITED STATES PATENTS

| | | |
|---|---|---|
| 2,540,377 | Pachaly | Feb. 6, 1951 |
| 2,721,578 | Pouppirt | Oct. 25, 1955 |
| 2,736,190 | Bockelmann et al. | Feb. 28, 1956 |
| 2,741,911 | Fitzpatrick et al. | Apr. 17, 1956 |
| 2,830,738 | Sorg et al. | Apr. 15, 1958 |
| 2,833,151 | Harvey | May 6, 1958 |